United States Patent
Blakeman et al.

(10) Patent No.: US 11,128,542 B2
(45) Date of Patent: Sep. 21, 2021

(54) INTERACTIVE USER INTERFACE TO VISUALLY DISPLAY THE IMPACT OF CONFIGURATION CHANGES ON A MANAGED NETWORK

(71) Applicant: ServiceNow, Inc., Santa Clara, CA (US)

(72) Inventors: Colby Andrew Blakeman, San Jose, CA (US); German Andres Bertot, San Carlos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 355 days.

(21) Appl. No.: 15/905,183

(22) Filed: Feb. 26, 2018

(65) Prior Publication Data

US 2019/0268244 A1    Aug. 29, 2019

(51) Int. Cl.
*G06F 3/0484* (2013.01)
*G06F 21/10* (2013.01)
*G06F 3/0481* (2013.01)
*H04L 12/24* (2006.01)
*G06Q 10/08* (2012.01)
*H04L 29/06* (2006.01)

(52) U.S. Cl.
CPC .......... *H04L 41/22* (2013.01); *G06F 3/04847* (2013.01); *G06F 21/105* (2013.01); *G06F 2221/0775* (2013.01); *G06Q 10/087* (2013.01); *H04L 67/42* (2013.01)

(58) Field of Classification Search
CPC .... G06F 21/10; G06F 21/105; G06F 3/04847; H04L 41/22

USPC ......................................................... 715/735
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |

(Continued)

*Primary Examiner* — Ariel Mercado
*Assistant Examiner* — Ariel Mercado Vargas
(74) *Attorney, Agent, or Firm* — Fletcher Yoder PC

(57) ABSTRACT

A system may be configured to: provide, to a client device of a managed network, a representation of a graphical user interface (GUI) that displays a nominal configuration of a computing device on which a particular software application is deployed or is a candidate for deployment, where licensing information in a database of the system respectively indicates a first license rights consumption for the particular software application; receive, by way of the GUI and from the client device, an indication of a proposed configuration of the computing device; in response to receiving the indication of the proposed configuration, determine a second license rights consumption that results from deploying the particular software application in accordance with the proposed configuration; and provide, to the client device, an updated representation of the GUI that displays a graphical indication of the second license rights consumption.

20 Claims, 9 Drawing Sheets

(56) References Cited

U.S. PATENT DOCUMENTS

| | | | |
|---|---|---|---|
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,836,452 B2 * | 11/2010 | Taylor | G06F 9/5083 709/226 |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,407,669 B2 * | 3/2013 | Yee | G06Q 10/06 717/120 |
| 8,457,928 B2 | 6/2013 | Dang | |
| 8,478,569 B2 | 7/2013 | Scarpelli | |
| 8,484,355 B1 * | 7/2013 | Lochhead | G06F 9/5072 709/226 |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 10,248,400 B1 * | 4/2019 | Coleman | G06F 8/60 |
| 2009/0228984 A1 * | 9/2009 | Sterin | G06F 21/105 726/26 |
| 2011/0173302 A1 * | 7/2011 | Rider | G06F 9/44505 709/220 |
| 2012/0331114 A1 * | 12/2012 | Garg | G06Q 10/00 709/220 |
| 2017/0308687 A1 * | 10/2017 | Marnell | G06F 21/6218 |

\* cited by examiner

Proposed Change 702

☑ ≡ Windows Server
     Server-WS18

710 → [Save Proposed Change]

704

| Name | Server-WS18 | Company | ABC |
| Asset tag | SAMWS10018 | Serial Number | SAM-141F133 |
| Manufacturer | XYZ | Model ID | ABCXYZ123 |

Configuration 706

| RAM (MB) | 1,791 | CPU speed (MHz) | 2,394 |
| CPU manufacturer | IBM | CPU count | 8 |
| CPU type | Power 5+ | CPU core count | 4 |

708 → Proposed Change from "2" to "4"

Software Change Projection 712

Current Spend $69,944.00
Projected Spend $127,929.33
Spend Change $57,985.33

FIG. 7

INTERACTIVE USER INTERFACE TO VISUALLY DISPLAY THE IMPACT OF CONFIGURATION CHANGES ON A MANAGED NETWORK

BACKGROUND

An enterprise may use many computing devices to efficiently facilitate and manage its many interrelated operations, and each such computing device may have one or more software applications installed thereon. Where the software is proprietary, the enterprise may procure licenses for the computing devices to use the software. Given this, the enterprise may seek to properly evaluate consumption of license rights associated with the software applications, so as to ensure that such consumption complies with license rights allocations and/or with other constraints imposed by the enterprise.

SUMMARY

Generally, an enterprise might make changes to software and/or hardware configuration(s) of computing device(s), and these changes could have various consequences. One such consequence that is often considered by an enterprise relates to costs of adding, removing, and/or upgrading certain hardware. But another consequence, often overlooked by enterprises, is the impact of changes to computing device configuration(s) on license rights consumption associated with various software application(s). This may include an impact on the number of rights respectively used for the software application(s) and/or an impact on costs associated with licenses for the software application(s), among other possibilities.

In accordance with the present disclosure, a system may be configured to generate information that can help an enterprise better evaluate the impact of changes to computing device configuration(s) on license rights consumption. The system may provide a remote network management platform that manages a managed network of the enterprise, and thus the system may transmit the generated information for display on client device(s) associated with the managed network.

More specifically, the system may provide, to a client device, a representation of a graphical user interface (GUI) that displays a nominal configuration of a computing device associated with the managed network. The nominal configuration may be a current configuration of the computing device and may relate to a number of physical processors and/or a number of processor cores currently included on the computing device, for example.

Through this GUI, a user of the client device may then provide input to specify a proposed configuration of the computing device, and the system may in turn receive an indication of this proposed configuration. The proposed configuration may relate to a proposed number of physical processors and/or a proposed number of processor cores to be included on the computing device, for example.

Once the system receives the indication of this proposed configuration, the system may then project a license rights consumption that results from deploying a particular software application in accordance with the proposed configuration. Then, once the projected license rights consumption is determined, the system may provide, to the client device, an updated representation of the GUI that displays a graphical indication of the projected license rights consumption.

By way of example, the system may determine and provide a graphical indication of a projected number of license rights to be used for the particular software application as result of deploying the particular software application in accordance with the proposed configuration. In another example, the system may determine and provide a graphical indication of projected costs associated with license rights for the particular software application, as might result from deploying the particular software application in accordance with the proposed configuration.

As such, the system could determine the impact of one or more configuration changes on license rights consumption for one or more software applications, and could provide, to client device(s), graphical indication(s) of the determined impact. And given that an enterprise may have numerous devices, software applications, and associated licenses, the system may help reduce the time and complexity of determining such a projected impact, because the system could automatically and efficiently evaluate some or all such devices, software applications, and/or associated licenses in order to determine the projected impact. Thus, when making a decision as to whether or not to carry out certain changes to computing device configuration(s), the enterprise could receive and evaluate valuable information related to the projected impact on software license rights consumption, which may be displayed via GUI as discussed.

Accordingly, a first example embodiment may involve a system including a database and one or more server devices disposed within a remote network management platform that manages a managed network. The database may contain licensing information that includes respective indications of license rights allocations and consumption for each of a plurality of software applications associated with the managed network. Additionally, one or more server devices may be configured to: provide, to a client device associated with the managed network, a representation of a graphical user interface that displays a nominal configuration of a computing device on which a particular software application of the plurality of software applications is deployed or is a candidate for deployment, where the licensing information respectively indicates a first license rights consumption for the particular software application; receive, by way of the graphical user interface and from the client device, an indication of a proposed configuration of the computing device; in response to receiving the indication of the proposed configuration, determine a second license rights consumption that results from deploying the particular software application in accordance with the proposed configuration; and provide, to the client device, an updated representation of the graphical user interface that displays a graphical indication of the second license rights consumption.

A second example embodiment may involve providing, by one or more server devices to a client device associated with a managed network, a representation of a graphical user interface that displays a nominal configuration of a computing device on which a particular software application, of a plurality of software applications associated with the managed network, is deployed or is a candidate for deployment, where the one or more server devices are disposed within a remote network management platform that manages the managed network, wherein a database is also disposed within the remote network management platform, where the database contains licensing information that includes respective indications of license rights allocations and consumption for each of the plurality of software applications, and where the licensing information respectively indicates a first license rights consumption for the particular software application. The second example embodiment may also involve receiving, by one or more server devices from the client device and by way of the graphical user interface, an indication of a proposed configuration of the computing device. The second example embodiment may additionally involve, in response to receiving the indication of the proposed configuration, determining, by the one or more server devices, a second license rights consumption that results from deploying the particular software application in accordance with the proposed configuration. The second example embodiment may further involve providing, by the one or more server devices to the client device, an updated representation of the graphical user interface that displays a graphical indication of the second license rights consumption.

In a third example embodiment, an article of manufacture may include a non-transitory computer-readable medium, having stored thereon program instructions that, upon execution by one or more server devices, cause the one or more server devices to perform operations in accordance with the first and/or second example embodiment.

In a fourth example embodiment, one or more server devices may include at least one processor, as well as memory and program instructions. The program instructions may be stored in the memory, and upon execution by the at least one processor, cause the one or more server devices to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts a graphical user interface that displays a proposed configuration and projected license rights consumption, in accordance with example embodiments.

DETAILED DESCRIPTION

Figure 1:
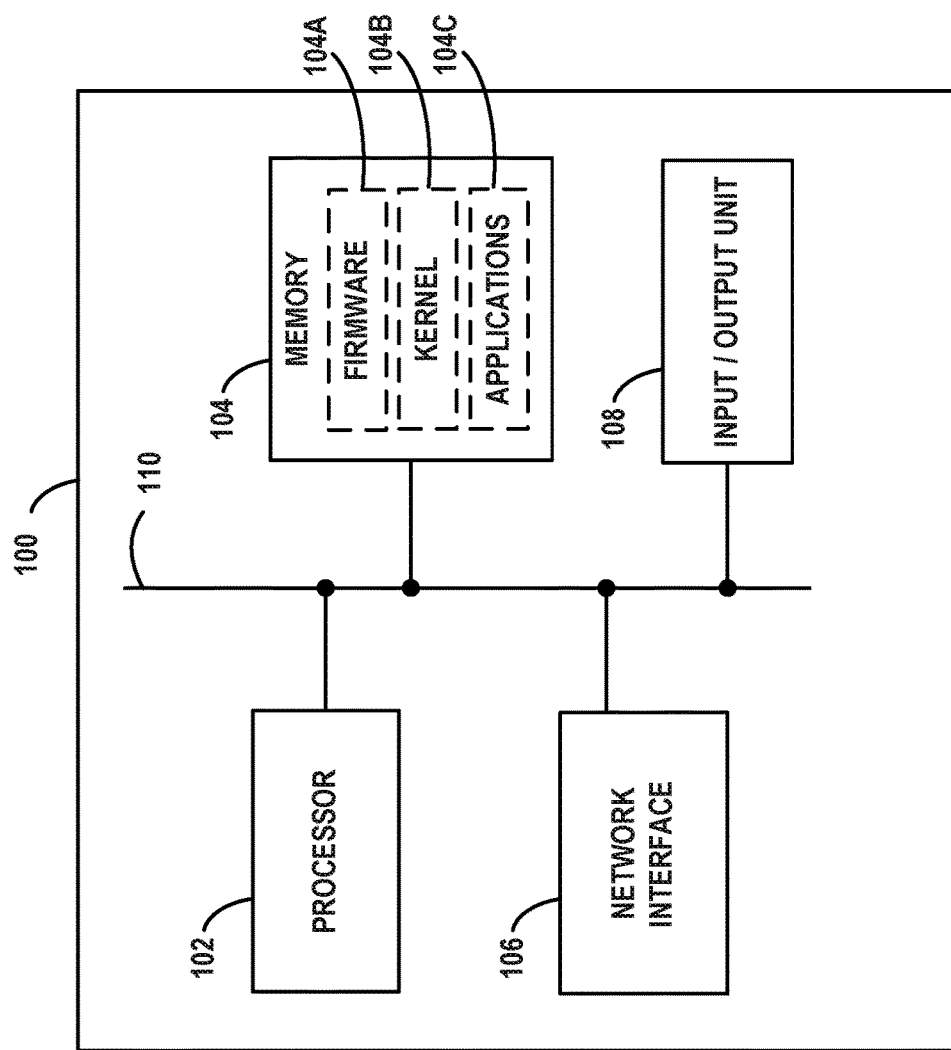
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
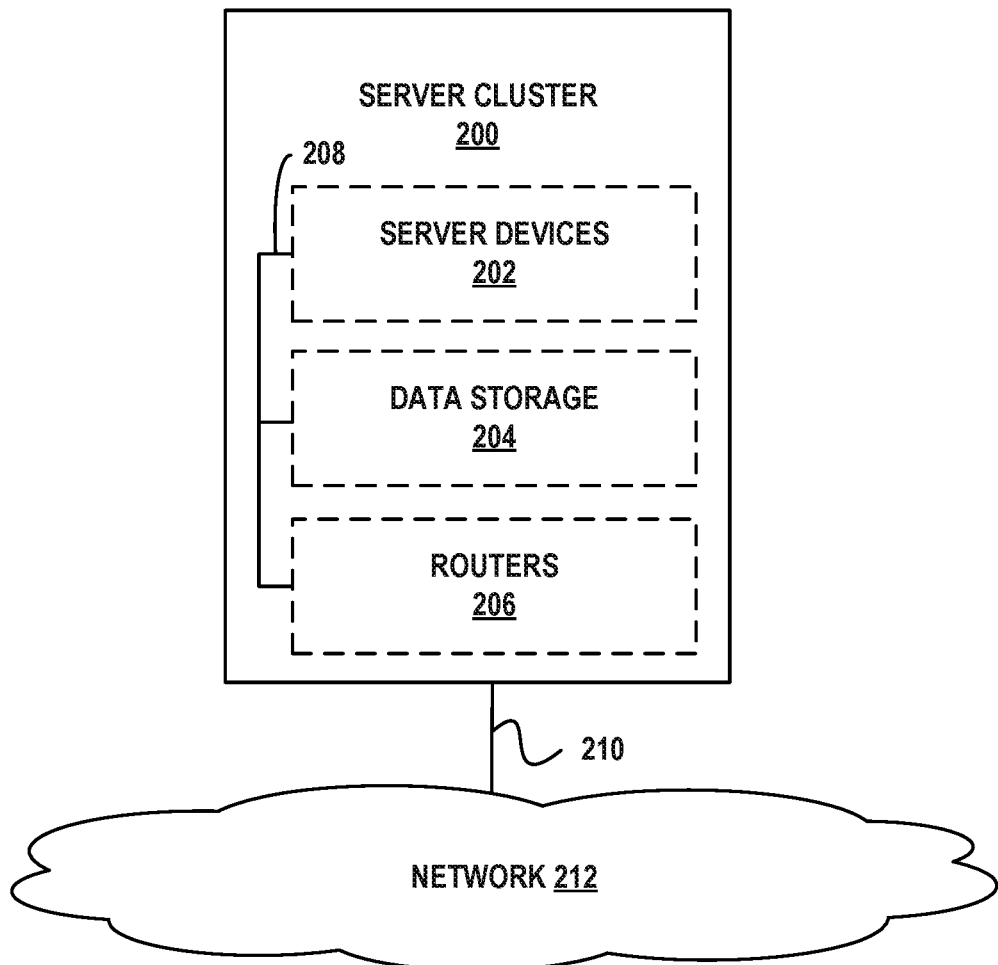
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to PERL, PYTHON, PHP Hypertext Preprocessor (PHP), Active Server Pages (ASP), JAVASCRIPT, and so on. Computer program code written in these languages may facilitate the providing of web pages to client devices, as well as client device interaction with the web pages.

III. Example Remote Network Management Architecture

Figure 3:
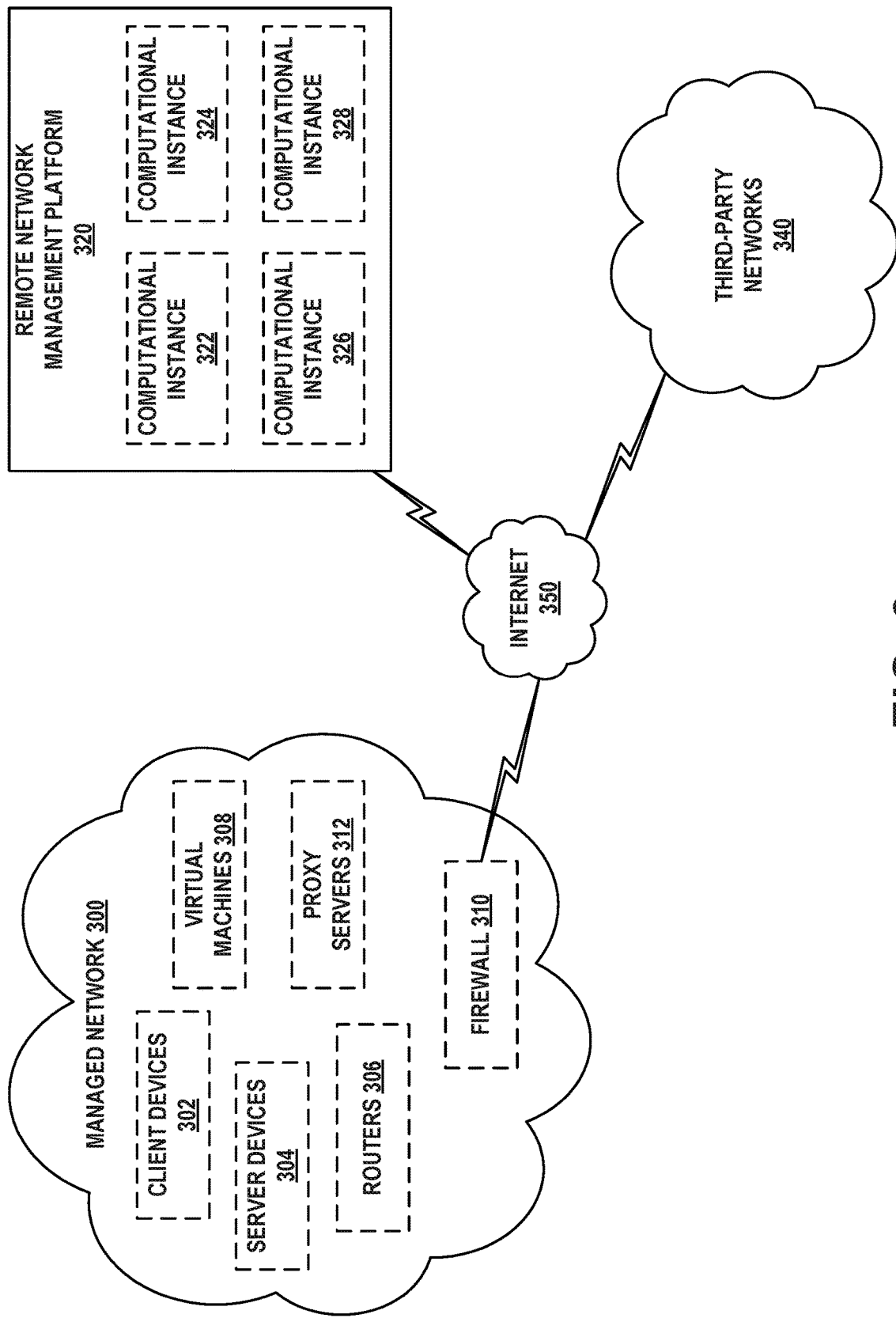
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
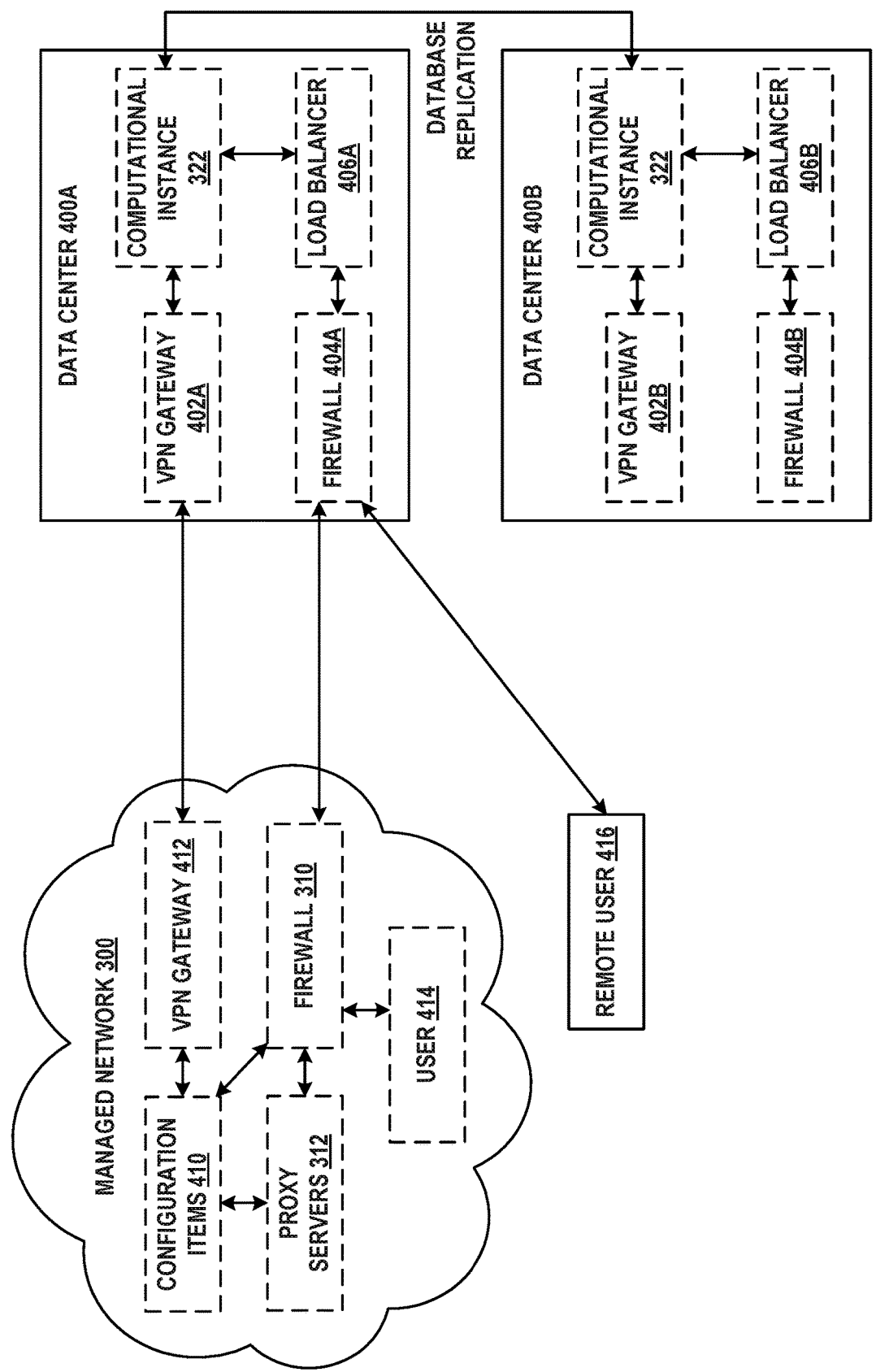
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
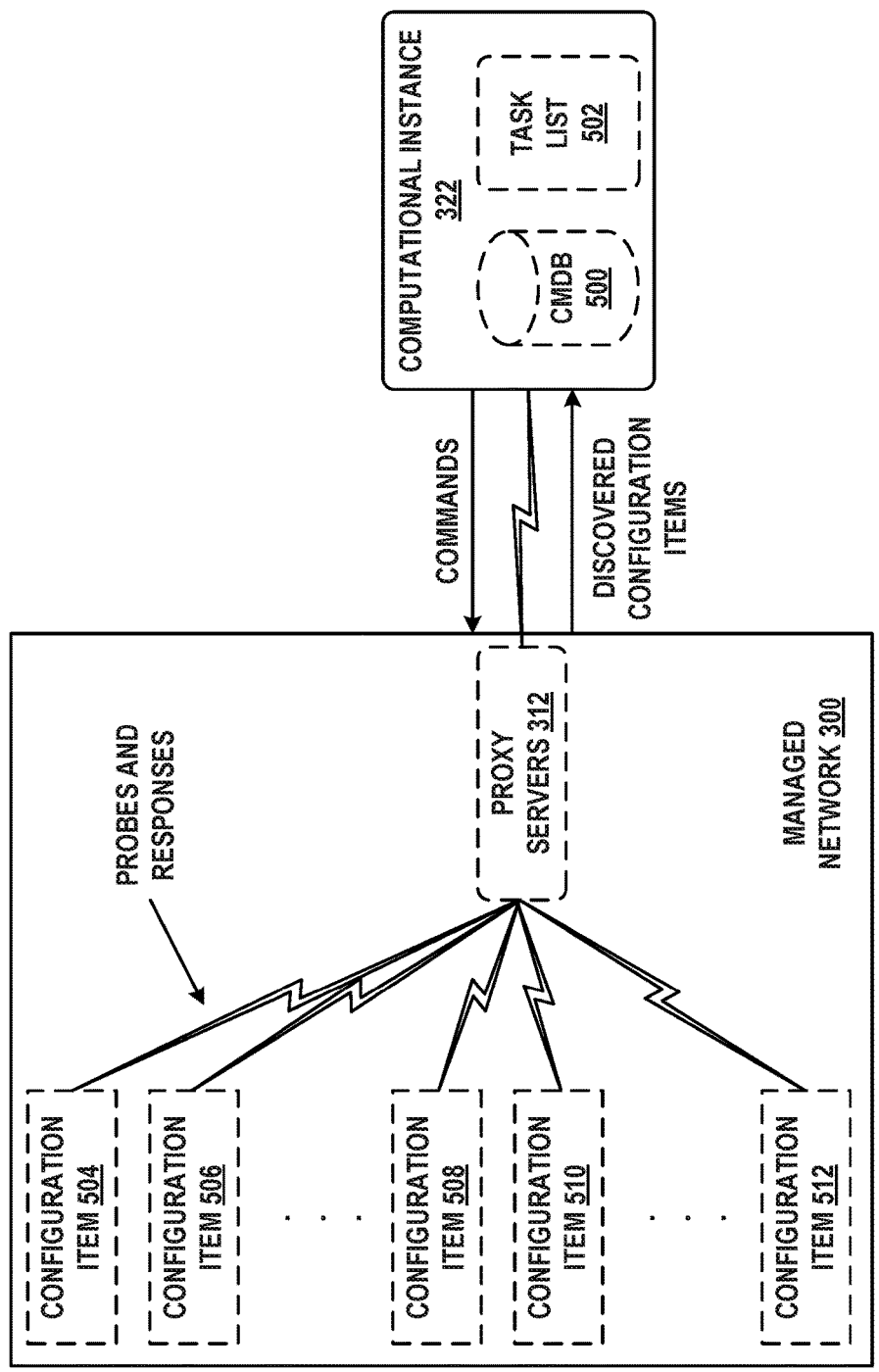
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
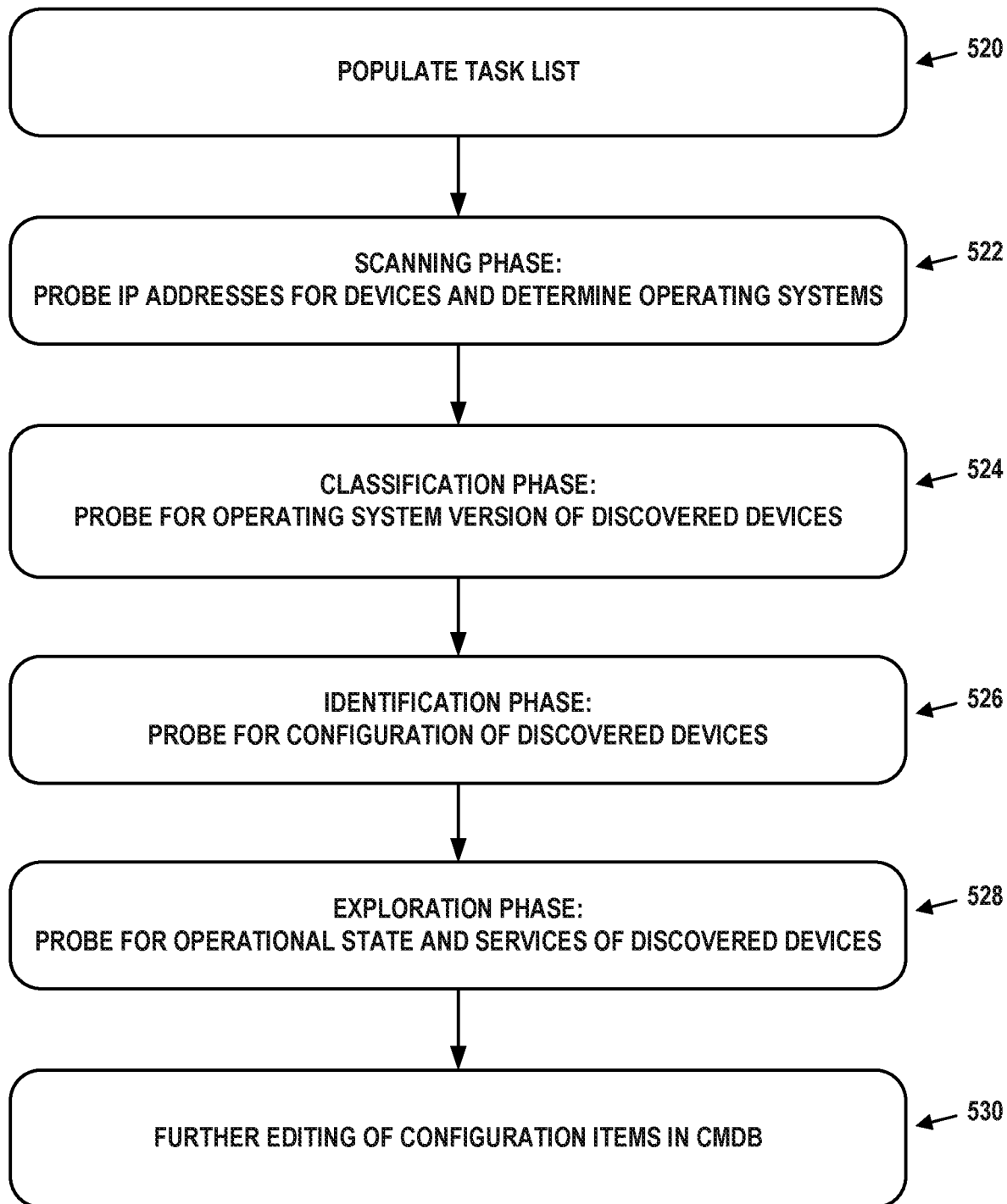
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Cmdb Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Determining Software Application Utilization

An enterprise may use the computing devices described above in relation to FIGS. 1 and 2 to facilitate and manage its many interrelated operations. In turn, the computing devices may rely on software applications to perform tasks. Each computing device may be tasked with performing a set of operations, and accordingly may use a combination of software applications to perform those tasks. While some such software applications may be hosted by an aPaaS system, as described above in relation to FIGS. 1 through 4, others may be installed on the individual computing devices themselves. Such software is often proprietary, and may be licensed in several ways.

By way of example, a software license may include "per-device" license rights, which may specify a number of computing/server devices that are permitted to use the software. In another example, computing devices may include various physical processors, and a software license may include "per-processor" license rights, which may specify a number of physical processors having permission to use the software. In yet another example, computing devices may include multi-core processors, and a software license may include "per-core" license rights, which may specify a number of processor cores having permission to use the software. Other examples are also possible.

Moreover, each software license may specify costs related to use of software. For example, with regard to per-device license rights, a software license may specify a licensing cost per device that uses the software (e.g., a cost of $1,200 for each computing device that has the software installed thereon). In another example, with regard to per-processor license rights, a software license may specify a licensing cost per physical processor that uses the software (e.g., a cost of $500 for each processor on which the software is installed). In yet another example, with regard to per-core license rights, a software license may specify a licensing cost per processor core that uses the software (e.g., a cost of $200 for each processor core on which the software is installed). In yet other examples, a software license may have a more complex costs arrangement, as the cost per device, processor, and/or core may vary depending on the number of device, processors and/or cores using the software (e.g., a cost of $500 per processor for the first ten processors that have the software installed thereon and a cost of $450 per processor for the next ten processors that have the software installed thereon, and so on.) Other licensing schemes are possible as well.

Regardless of the licensing scheme, the enterprise may attempt to keep track of which of its computing devices, physical processors, and/or processor cores use what licensed software. In so doing, the enterprise may determine whether it is in compliance with its various software licenses, whether it is using its licensed software efficiently, and whether it should purchase new software licenses.

Tracking software application usage across an entire enterprise may present challenges. A large enterprise may use thousands of separate computing devices, each of which may use a set of software applications. Further, such computing devices may go in and out of service, require different software applications over time, and/or require different hardware configurations over time, among other possibilities. Moreover, certain software application may be installed and/or uninstalled from certain computing devices without supervision or notice.

Tracking the use of software within an enterprise may be achieved using an aPaaS system as described above in relation to FIGS. 1 through 5B. Such an aPaaS system may be particularly suited to tracking such software usage because the aPaaS system may gather information from computing devices in managed networks such as the enterprise.

Tracking the use of software within an enterprise may involve determining configuration items in the manner described above in relation to FIGS. 5A through 5B. For instance, the aPaaS system may determine which software applications are installed on computing devices within managed network 300 in a similar fashion to the example scenario described above with regard to FIGS. 5A and 5B.

To accurately track such software usage, the aPaaS system could determine which computing devices, physical processors, and/or processor cores utilize what software applications. For example, during identification phase 526 of discovery, customer instance 322 may determine the configuration of discovered devices, including identification parameters indicative of specific computing devices. Further, during exploration phase 528, customer instance 322 may determine services such as software applications of each discovered device. The identification parameters associated with such software applications may indicate on which specific computing device(s) each software application is installed. However, the identification parameters may additionally or alternatively specify a number of processors or cores of a computing device, a device name, or a named user, associated with each software application. The identification parameters associated with the software applications may further indicate how often each software application is used by each device, processor, core, or user etc.

Further, the aPaaS system could determine to what extent the enterprise is in compliance with its software licenses. Determining such compliance may be referred to as "reconciliation." For example, the system may run discovery on computing devices within managed network 300 to determine how many times each software application has been installed. In other examples, the aPaaS system may rely on past discovery to determine how many instances of the software application have been installed. For example, the configuration items stored on CMDB 500 may be sufficient to determine how many instances are installed within managed network 300. The aPaaS system may also determine what software application license rights are held by the managed network. Finally, the aPaaS system may associate the installed software applications with the software license rights. Such reconciliation of the software applications may be based on a license metric associated with a specified software license. As noted above, the license metric may specify that installations are counted per-device, per-processor, or per-core, among other options.

When determining a number of software license rights under a per-device license metric, the aPaaS system may count each computing device within the managed network where a particular software application is deployed, even where installed software applications are using more than one processor or processor core on certain of the computing devices. For instance, a computing device that runs the particular software application may have two processors contained therein, and each processor may include four cores. If each core of each processor is used to run the particular software application, totaling eight cores running the software application, only one software license right would be counted when using the per-device license metric. In this regard, it should be noted that, when devices are in certain computing arrangements (e.g., a server cluster), software does not necessarily need to be installed on each device if the software is available or otherwise accessible to device(s) on which it is not installed.

When determining a number of software license rights under a per-processor license metric, the aPaaS system may count each processor within the managed network where a particular software application is deployed. For example, when a computing device that runs the particular software application has two processors, both processors would be counted when using the per-processor license metric. However, if each processor included four cores, the software license right count would still equal two under the per-processor license metric.

In this regard, a definition of a per-processor license metric could depend on the software publisher in question. For example, in some cases, one or more processors of computing device(s) could each respectively have a particular software application installed thereon. And when determining a number of software license rights under a per-processor license metric, the aPaaS system could count each processor within the managed network that has the particular software application installed thereon. Other examples are also possible.

When determining a number of software license rights under a per-core license metric, the aPaaS system may count each core within the managed network where a particular software application is deployed. For example, when a computing device that runs the particular software application has two processors each having four cores, eight software license rights would be counted under the per-core license metric.

In this regard, a definition of per-core license metric could depend on the software publisher in question. For example, in some cases, one or more cores within computing device(s) could each respectively have a particular software application installed thereon. And when determining a number of software license rights under a per-core license metric, the aPaaS system could count each core within the managed network that has the particular software application installed thereon. Other examples are also possible.

Generally, the aPaaS system may perform an action based on the extent to which the enterprise is in compliance with its software licenses. For example, the system may provide, via a GUI, a recommendation to purchase additional licenses, to install a software application on more devices, or to uninstall the software application from certain computing devices within the managed network. In some examples, the aPaaS system, upon determination that certain criteria have been met, may automatically purchase additional software, or reorganize which devices, processors, or cores upon which the software applications are installed. Various other examples are also possible.

VII. Projecting Impact of a Proposed Configuration on License Rights Consumption As noted, an enterprise might make changes to software and/or hardware configuration(s) of computing device(s), and these changes could have various consequences. One such consequence may be an impact of the changes on license rights consumption associated with various software application(s). This may include an impact on the number of rights respectively used for the software application(s) and/or an impact on costs associated with licenses for the software application(s), among other possibilities. In any case, such impact may often be overlooked by an enterprise or may otherwise be difficult for an enterprise to project before configuration changes are carried out.

Disclosed herein is a system that would allow an enterprise to evaluate how proposed configuration(s) of computing device(s) may impact license rights consumption for software application(s). In accordance with the present disclosure, a remote network management platform could be arranged to determine and provide, for display on client device(s) associated with a managed network, information related to projected impact of change(s) to computing device configuration(s) on license rights consumption.

Figure 6:
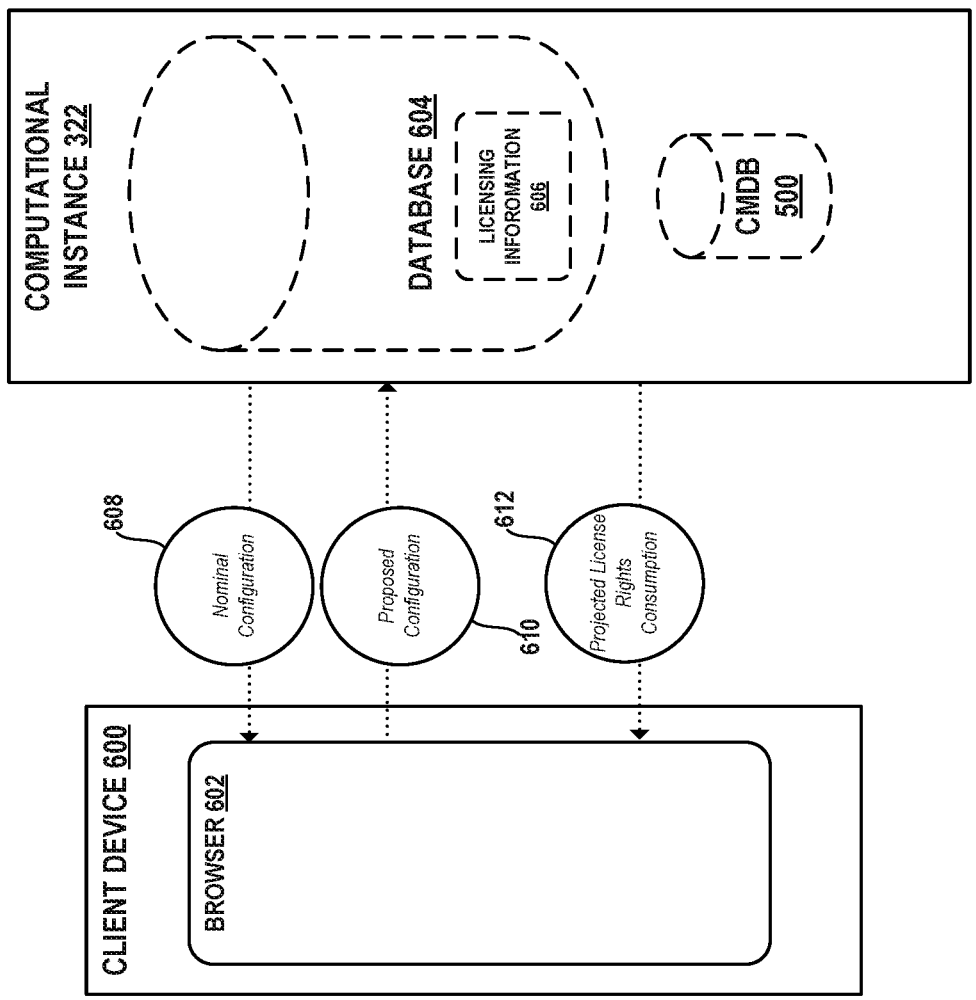
FIG. 6 depicts communication between a client device and a computational instance, in accordance with example embodiments.

FIG. 6 illustrates features, components, and operations of a system that determines and provides information related to projected impact of change(s) to computing device configuration(s) on license rights consumption. Although FIG. 6 illustrates a specific arrangement, various operations disclosed herein may be carried out in the context of similar and/or other arrangement(s) as well without departing from the scope of the present disclosure.

Specifically, FIG. 6 illustrates a client device 600, which may be one of the client devices 302 on the managed network 300. Generally, the client device 600 may engage in communication with computational instance 322, such as via wired and/or wireless communication link(s) (not shown). In this regard, the computational instance 322 may include one or more server devices (not shown) that engage in communications with client device 600 and that may be disposed within a remote network management platform, such as remote network management platform 320, so as to support remote management of the client device 600's managed network.

Moreover, as shown, the client device 600 may be configured to operate a web browser 602, which is a software application that may retrieve, present, and/or navigate through information on the World Wide Web and/or on private websites. The browser 602 may include a web-display tool (not shown) that provides for or otherwise supports display of information, such as information received from the computational instance 322. For example, as further discussed herein, the web-display tool may display information related to a projected license rights consumption provided by the computational instance 322. Other examples are also possible.

In FIG. 6, computational instance 322 is shown to include CMDB 500 and a database 604 that contains licensing information 606. Although CMDB 500 and database 604 are shown to be separate, database 604 could be part of CMDB 600, such that CMDB 500 contains the licensing information 606. Additionally, although computational instance 322 is shown to include certain features, computational instance 322 may include any feasible combination of features, so as to facilitate aspects of the present disclosure.

As discussed, CMDB 500 is a database that is disposed within a remote network management platform and that contains information regarding discovered configuration items of a managed network, such as of client device 600's managed network. For example, CMDB 500 may contain information about computing devices of the managed network and/or information about a plurality of software applications installed on devices of the managed network.

Further, as noted, database 604 contains licensing information 606, which may include information related to software licenses held by the managed network.

Generally, the licensing information 606 may include respective indications of license rights allocations and consumption for each of a plurality of software applications associated with the managed network. For example, the licensing information 606 may specify a number of license rights used by devices, processors, and/or cores of the managed network in association with a given software application. In another example, the licensing information 606 may specify a number of license rights allocated to devices, processors, and/or cores of the managed network in association with a given software application.

In some embodiments, the licensing information 606 may additionally or alternatively include respective indications of license metrics for each of the plurality of software applications. For example, the licensing information 606 may specify that license rights for a given software application include per-core license rights, per-processor license rights, and/or per-device license rights.

In yet other embodiments, the licensing information 606 may additionally or alternatively include respective indications of licensing costs for each of the plurality of software applications. For example, the licensing information 606 may specify a particular licensing cost per a license right used in association with a given software application. In more specific examples, depending on the license metric(s) specified for a given software application, the licensing information 606 may specify a licensing cost per device that uses the given software application, a licensing cost per physical processor that uses the given software application, and/or a licensing cost per processor core that uses the given software application. Other examples are also possible.

In a system arranged as described above, client device 600 and computational instance 322 may engage in various communications with one another. In practice, these communications may trigger and/or may be triggered by one or more operations by respective features/components of client device 600 and computational instance 322.

More specifically, computational instance 322 may provide, to the client device 600, a representation of a GUI that displays a nominal configuration 608 of a computing device. The computational instance 322 could do so automatically and/or in response to a request from the client device 600 provided by way of the GUI, among other options.

In any case, the computing device at issue could take various forms and could have one or more software applications installed thereon. For example, the computing device may be a server device of the client device 600's managed network, such as one of the server device 304 for example, or could be a virtual machine on the server device, such as one of the virtual machines 308 for example, among other possibilities. In other examples, the computing device could be a computing device that hypothetically can be added to the managed network, that has been proposed for addition to the managed network, or that has already been planned for addition to the managed network, among other possibilities. Moreover, the computing device at issue may be one on which a particular software application is deployed or is a candidate for deployment. For example, the particular software application may already have been installed on the computing device or is being considered for installation on the computing device.

With regard to this particular software application, the licensing information 606 may respectively indicate a first license rights consumption for the particular software application. The first license rights consumption may be the current license rights consumption, such as one that relates to extent of consumption of license rights for the particular software application substantially at a time that the nominal configuration 608 is being displayed by the client device 600. As such, the first license right consumption may be defined in various ways.

Generally, the first license rights consumption may include the number of license rights used in association with the particular software application. For example, the licensing information 606 may indicate that ten license rights (e.g., per-core license rights) are currently being used by the managed network in association with the particular software application.

Additionally or alternatively, the first license rights consumption may include a licensing cost for the particular software application. For example, if licensing information 606 respectively indicates that ten per-core license rights are currently being used by the managed network in association with the particular software application and also specifies a licensing cost of fifty dollars ($50) per processor core that uses the particular software application, then a licensing cost for the particular software application amounts to be five hundred dollars ($500). Other examples are also possible.

Nonetheless, when computational instance 322 provides the representation of the GUI that displays the nominal configuration 608 of the computing device, the information provided about the nominal configuration 608 in the GUI may be based on information specified in the CMDB 500 for the computing device. Specifically, the nominal configuration 608 may relate to current hardware and/or software aspect(s) of the computing device, such as those specified in the CMDB 500 for the computing device at a time that the representation at issue is provided to the client device 600. As such, the nominal configuration 608 may be a nominal hardware configuration and/or nominal software configuration of the computing device.

When the nominal configuration 608 is a nominal hardware configuration, the GUI may display information about one or more hardware features of the computing device. For example, the nominal hardware configuration may relate to a nominal count of physical processors on the computing device, which may be a count of physical processors specified in the CMDB 500 for the computing device at a time that the representation at issue is provided to the client device 600. In another example, the nominal hardware configuration may relate to a nominal count of processor cores on the computing device, which may be a count of processor cores specified in the CMDB 500 for the computing device at a time that the representation at issue is provided to the client device 600. In this example, the processor cores could be physical core(s) on physical processor(s) of server device(s) and/or virtual core(s) on virtual machine(s), among other options. In yet another example, the nominal hardware configuration may relate to an option of deploying or otherwise adding the computing device to the managed network.

As such, the representation of the GUI that is provided to the client device 600 could display information about a nominal count of physical processors on the computing devices, about a nominal count of processor cores on the computing device (e.g., an indication of a number of physical processors in addition to an indication of a number of processor cores per physical processor), and/or about the option of deploying or otherwise adding the computing device to the managed network, among others.

On the other hand, when the nominal configuration 608 is a nominal software configuration, the GUI may display information about one or more software features of the computing device. For example, the nominal software configuration may relate to information about one or more software application currently installed on the computing device, such as in accordance with information specified in the CMDB 500. This may include information about the above-described particular software application for which a first license rights consumption is specified in the licensing information 606. In another example, the nominal software configuration may relate possible installation or upgrading of certain software application(s) on the computing device. Here again, this may include an option to install or upgrade the above-described particular software application on the computing device. As such, the representation of the GUI that is provided to the client device 600 could display information about software application(s) currently installed on the computing device and/or about software application(s) that are candidate for installation or upgrading on the computing device among others.

Further, the representation of the GUI that displays the nominal configuration 608 of the computing device could take various forms and could include various interface features.

By way of example (and without limitation), the representation may include an identification section and a configuration section. The identification section may be arranged to display identifying characteristics of the computing device, such as a name, manufacturer, model, and/or identifier of the computing device, among others. Whereas, the configuration section may be arranged to display information related to the nominal configuration 608, such as by displaying a nominal count of physical processors on the computing device and/or a nominal count of processor cores on the computing device, among other options.

Moreover, the representation of the GUI could also include an interface feature that is arranged for specifying characteristics of a proposed configuration 610 of the computing device, and may also include a submission feature that is selectable to cause the client device 600 to provide, to the computational instance 322, an indication of the proposed configuration 610, as shown in FIG. 6. Generally, one or both of these features could be included as part of the above-described configuration section of the GUI, among other options.

Accordingly, when computational instance 322 receives an indication of the proposed configuration 610 of the computing device, the indication of the proposed configuration 610 may be based input provided by way of the GUI, such as by a user of the managed network. This proposed configuration 610 may relate to hardware and/or software feature(s) proposed for inclusion in the computing device at a future time, and, in many situations, may require review and approval by an individual at the enterprise before being implemented in practice. As such, the proposed configuration 610 may be a proposed hardware configuration and/or a proposed software configuration of the computing device.

When the proposed configuration 610 is a proposed hardware configuration, the computational instance 322 may receive information about one or more proposed hardware features for the computing device. For example, the proposed hardware configuration may relate to a proposed count of physical processors on the computing device, which may be a count of physical processors proposed for inclusion in the computing device at a future time. In another example, the proposed hardware configuration may relate to a proposed count of processor cores on the computing device, which may be a count of processor cores proposed for inclusion in the computing device at a future time. In this example, the processor cores could be physical core(s) on physical processor(s) of server device(s) and/or virtual core(s) on virtual machine(s), among other options. In yet another example, the proposed hardware configuration may relate to a proposal to deploy or otherwise add the computing device to the managed network.

As such, when computational instance 322 receives the indication of the proposed configuration 610 of the computing device, the indication may specify a proposed count of physical processors, a proposed count of processor cores on the computing device (e.g., a proposed number of physical processors and/or a proposed number of processor cores per physical processor), and/or a proposal to deploy or otherwise add the computing device to the managed network, among others.

On the other hand, when the proposed configuration 610 is a proposed software configuration, the computational instance 322 may receive information about one or more proposed software features for the computing device. For example, the proposed software configuration may relate to a proposal to install or upgrade certain software application(s) on the computing device, such as a proposal to install or upgrade the above-mentioned particular software application on the computing device. As such, when computational instance 322 receives the indication of the proposed configuration 610 of the computing device, the indication may specify information about software application(s) that are proposed for installation or upgrading on the computing device. Other examples are also possible.

Given this, the proposed configuration 610 of the computing device may be different from the nominal configuration 608 of the computing device. For example, the nominal configuration 608 may specify a nominal count of physical processors on the computing device that is different (e.g., higher or lower) from a proposed count of physical processors on the computing device as specified by the proposed configuration 610. In another example, the nominal configuration 608 may specify a nominal count of processor cores on the computing device that is different (e.g., higher or lower) from a proposed count of processor cores on the computing device as specified by the proposed configuration 610. In yet another example, the nominal configuration 608 may specify that the above-mentioned particular software application is a candidate for deployment on the computing device, and the proposed configuration 610 may include a proposal to deploy this particular software application on the computing device. Other examples are also possible.

Once the computational instance 322 receives the indication of the proposed configuration 610, the computational instance 322 may determine a second license rights consumption that results from deploying the above-mentioned particular software application in accordance with the proposed configuration 610. The second license rights consumption may be a projected license rights consumption, such as one that relates to extent of consumption of license rights for the particular software application at a future time. In practice, depending on the proposed configuration 610, the second license rights consumption could end up being greater, lesser, or the same as the first license rights consumption. Nonetheless, the second license rights consumption may be defined in various ways.

Generally, the second license rights consumption may include a projected number of license rights to be used in association with the particular software application and/or a projected change in the number of license rights used in association with the particular software application. For example, the computational instance 322 may determine that, as a result of the proposed configuration 610, fifteen license rights (e.g., per-core license rights) are projected to be used by the managed network in association with the particular software application. And assuming that the licensing information 606 indicates that ten license rights are currently being used by the managed network in association with the particular software application, the computational instance 322 could determine that the number of license rights used in association with the particular software application is projected to increase by a count of five license rights.

Additionally or alternatively, the second license rights consumption may include projected licensing costs for the particular software application, and/or a projected change in licensing costs for the particular software application. For example, the computational instance 322 may determine that, as a result of the proposed configuration 610, licensing costs for the particular software application are projected to be seven hundred and fifty dollars ($750). And in line with the examples above, assuming that current licensing costs for the particular software application are at five hundred dollars ($500), the computational instance 322 may also determine that licensing costs for the particular software application are projected to increase by an amount of two hundred and fifty dollars ($250). Other examples are also possible.

Given this, the computational instance 322 could use various approaches to determine the second license rights consumption that may result from deploying the particular software application in accordance with the proposed configuration 610. Although a certain approach is described, other approaches may be possible as well without departing from the scope of the present disclosure.

As an initial matter, the computational instance 322 may refer to licensing information 606 to determine a license metric associated with the particular software application. For example, the computational instance 322 may determine whether installations for the particular software application are counted per-device, per-processor, or per-core. Then, the computational instance 322 could use at least the determined license metric as basis for determining how the proposed configuration 610 may impact license rights consumption for the particular software application.

In one case, if the computational instance 322 determines a per-processor license metric for the particular software application, then the computational instance 322 may determine a projected number of physical processors that will use the particular software application as a result of the proposed configuration 610. In this case, this projected number of physical processors may correspond to the projected number of license rights to be used in association with the particular software application.

For example, based on information in CMDB 500, the computational instance 322 may determine that eight physical processors within the managed network currently run the particular software application installed on device(s) of the managed network, and that two of these physical processors are of the computing device at issue (i.e., the computing device for which the proposed configuration 610 is provided). If the proposed configuration 610 specifies a proposed count of six physical processors on the computing device, then the computational instance 322 may determine that twelve physical processors are projected to run the particular software application, as the proposed configuration 610 would amount to an increase of physical processors on the computing device by a count of two. As such, the computational instance 322 may determine that, as a result of the proposed configuration 610, twelve per-processor license rights are projected to be used in association with the particular software application.

In another example, based on information in CMDB 500, the computational instance 322 may determine that ten physical processors within the managed network currently run the particular software application installed on device(s) of the managed network, and that four of these physical processors are of the computing device at issue. If the proposed configuration 610 specifies proposed count of four processor cores per physical processor on the computing device without also specifying a change in the number of physical processors on the computing device, then the computational instance 322 may determine that still ten physical processors are projected to run the particular software application, as the proposed configuration 610 would not change the number of physical processors on the computing device. As such, the computational instance 322 may determine that, as a result of the proposed configuration 610, ten per-processor license rights are projected to be used in association with the particular software application, which means that the proposed configuration 610 would not impact license rights consumption for the particular software application.

In yet another example, based on information in CMDB 500, the computational instance 322 may determine that four physical processors within the managed network currently run the particular software application installed on device(s) of the managed network, that the particular software application is not currently installed or otherwise run on the computing device at issue, and that the computing device at issue has four physical processors. If the proposed configuration 610 specifies a proposal to deploy the particular software application on the computing device, then the computational instance 322 may determine that eight physical processors are projected to run the particular software application, as the proposed configuration 610 would cause the particular application to be run on the computing device's four physical processors in addition to the four physical processors within the managed network that currently run the particular software application. As such, the computational instance 322 may determine that, as a result of the proposed configuration 610, eight per-processor license rights are projected to be used in association with the particular software application. Other examples are also possible.

In another case, if the computational instance 322 determines a per-core license metric for the particular software application, then the computational instance 322 may determine a projected number of processor cores that will run the particular software application as a result of the proposed configuration 610. In this case, this projected number of processor cores may correspond to the projected number of license rights to be used in association with the particular software application.

For example, based on information in CMDB 500, the computational instance 322 may determine that sixteen processor cores within the managed network currently run the particular software application installed on device(s) of the managed network, and that four of these processor cores are on two physical processors of the computing device at issue (e.g., two processor cores per physical processor). If the proposed configuration 610 specifies a proposed count of three physical processors on the computing device each having two processor cores, then the computational instance 322 may determine that eighteen processor cores are projected to run the particular software application installed on device(s) of the managed network, as the proposed configuration 610 would amount to an increase of processor cores on the computing device by a count of two. As such, the computational instance 322 may determine that, as a result of the proposed configuration 610, eighteen per-core license rights are projected to be used in association with the particular software application.

In another example, based on information in CMDB 500, the computational instance 322 may determine that ten processor cores within the managed network currently run the particular software application installed on device(s) of the managed network, and that eight of these processor cores are on two physical processors of the computing device at issue (e.g., four processor cores per physical processor). If the proposed configuration 610 specifies proposed count of eight processor cores per physical processor on the computing device without also specifying a change in the number of physical processors on the computing device, then the computational instance 322 may determine that eighteen processor cores are projected to run the particular software application installed on device(s) of the managed network, as the proposed configuration 610 would change the number of processor cores on the computing device by a count of eight. As such, the computational instance 322 may determine that, as a result of the proposed configuration 610, eighteen per-core license rights are projected to be used in association with the particular software application.

In yet another example, based on information in CMDB 500, the computational instance 322 may determine that eight processor cores within the managed network currently run the particular software application installed on device(s) of the managed network, that the particular software application is not currently installed or otherwise run on the computing device at issue, and that the computing device at issue has six physical processors each having two processor cores, thereby amounting to twelve processor cores on the computing device. If the proposed configuration 610 specifies a proposal to deploy the particular software application on the computing device, then the computational instance 322 may determine that twenty processor cores are projected to run the particular software application installed on device(s) of the managed network, as the proposed configuration 610 would cause the particular application to be run on the computing device's twelve processor cores in addition to the eight processor cores within the managed network that currently run the particular software application. As such, the computational instance 322 may determine that, as a result of the proposed configuration 610, twenty per-core license rights are projected to be used in association with the particular software application. Other examples are also possible.

In yet another case, if the computational instance 322 determines a per-device license metric for the particular software application, then the computational instance 322 may determine a projected number of computing devices that will run the particular software application as a result of the proposed configuration 610 or a projected number of computing devices that will have the particular software application installed thereon as a result of the proposed configuration 610. In this case, this projected number of computing devices may correspond to the projected number of license rights to be used in association with the particular software application.

For example, based on information in CMDB 500, the computational instance 322 may determine that thirty computing devices within the managed network currently run the particular software application installed on device(s) of the managed network, and that the particular software application is not currently installed or otherwise run on the computing device at issue. If the proposed configuration 610 specifies a proposal to deploy the particular software application on the computing device at issue, then the computational instance 322 may determine that thirty one computing devices within the managed network are projected to run the particular software application installed on device(s) of the managed network, as the proposed configuration 610 would cause the particular application to be run on one additional computing device. As such, the computational instance 322 may determine that, as a result of the proposed configuration 610, thirty one per-device license rights are projected to be used in association with the particular software application. Other cases and examples are also possible.

Once the projected number of license rights is determined, the computational instance 322 may use this projected number as basis for determining various other metrics that could be represented by the above-described second license rights consumption.

By way of example, the computational instance 322 may determine a projected change in the number of license rights used in association with the particular software application. To do so, the computational instance 322 may determine a difference between (i) the number of license rights projected to be used by the managed network in association with the particular software application and (ii) the number of license rights currently being used by the managed network in association with the particular software application.

In another example, the computational instance 322 may determine projected licensing costs for the particular software application. To do so, the computational instance 322 may refer to licensing information 606 to determine a particular licensing cost per a license right used in association with the particular software application. Then, the computational instance 322 may determine the projected licensing costs to be a product of (i) the particular licensing cost per license right used in association with the particular software application and (ii) the projected number of license rights to be used in association with the particular software application.

In yet another example, the computational instance 322 may determine a projected change in licensing costs for the particular software application. Here again, the computational instance 322 may refer to licensing information 606 to determine a particular licensing cost per a license right used in association with the particular software application. Then, the computational instance 322 may determine the projected change in licensing costs to be a product of (i) the particular licensing cost per license right used in association with the particular software application and (ii) the projected change in the number of license rights used in association with the particular software application. Various other examples are also possible.

Once the computational instance 322 determines the second license rights consumption (could also be referred to as a projected license rights consumption) that results from deploying the above-mentioned particular software application in accordance with the proposed configuration 610, the computational instance 322 may provide, to the client device 600, an updated representation of the GUI that displays a graphical indication 612 of the second license rights consumption. The computational instance 322 could do so in response to receiving the indication of the proposed configuration 610 and/or in response to a request from the client device 600 provided by way of the GUI, among other options.

Accordingly, when computational instance 322 provides the updated representation of the GUI, the GUI on the client device 600 may then display information related to the determined second license rights consumption. For example, the GUI may display graphical indicator(s) of a projected number of license rights to be used in association with the particular software application, of a projected change in the number of license rights used in association with the particular software application, of projected licensing costs for the particular software application, and/or of a projected change in licensing costs for the particular software application, among other options.

In some embodiments, the computational instance 322 could additionally determine information related to projected software license compliance, and could provide this information to the client device 600 for display, such as part of the above-mentioned updated representation and/or as part of a separate representation of the GUI. In this way, an enterprise could determine whether the second license rights consumption resulting from the proposed configuration 610 would be in compliance with license rights allocations for the particular software application.

In particular, based on the licensing information 606, the computational instance 322 could determine a number of license rights allocated to the managed network for the particular software application. Given this, the computational instance 322 could then determine whether or not the second license right consumption exceeds the number of license rights allocated to the managed network for the particular software application. For example, the computational instance 322 could determine whether or not the number of license right projected to be used by the managed network for the particular software application is expected to exceed the number of license rights allocated to the managed network for the particular software application. As such, the computational instance 322 could provide, to the client device 600, a representation of the GUI that displays a graphical indication of whether or not the second license right consumption exceeds the number of license rights allocated to the managed network for the particular software application. Other examples are also possible.

Although various aspects of the present disclosure have been described in the context of determining impact of proposed configuration change(s) to a single computing device on license rights consumption for a single software application, aspects of the present disclosure may extend to apply in the context of determining impact of configuration change(s) to one or more computing devices on license rights consumption for one or more software applications.

In one case, computational instance 322 may determine and provide, to a client device for display via a GUI, information related to impact of configuration changes to two or more computing devices on license rights consumption for a single software applications.

For example, the client device 600 may display nominal configurations respectively of first and second computing devices within the managed network, and the computational instance 322 may then receive, from the client device 600, a first indication of a first proposed configuration of the first computing device as well as a second indication of a second proposed configuration of the second computing device. Responsively, the computational instance 322 may determine a total license rights consumption that results from deploying a particular software application in accordance with the first and second proposed configurations. In line with the discussion above, this total license rights consumption may include a projected number of license rights to be used in association with the particular software application, a projected change in the number of license rights used in association with the particular software application, projected licensing costs for the particular software application, and/or a projected change in licensing costs for the particular software application, among others. As such, the computational instance 322 may provide, to the client device 600, a representation of the GUI that displays a graphical indication of the total license rights consumption.

In another case, computational instance 322 may determine and provide, to a client device for display via a GUI, information related to impact of a configuration change to a single computing device on license rights consumption for two or more software applications.

For example, the licensing information 606 may indicate current license rights consumption respectively for each of first and second software applications, and computational instance 322 may receive an indication of a proposed configuration of a computing device. Responsively, the computational instance 322 may determine (i) a first projected license rights consumption that results from deploying the first software application in accordance with the proposed configuration and (ii) a second projected license rights consumption that results from deploying the second software application in accordance with the proposed configuration. In line with the discussion above, each such projected license rights consumption may respectively include a projected number of license rights to be used in association with the respective software application, a projected change in the number of license rights used in association with the respective software application, projected licensing costs for the respective software application, and/or a projected change in licensing costs for the respective software application, among others. As such, the computational instance 322 may provide, to the client device 600, a representation of the GUI that displays graphical indication(s) of the first and second projected license rights consumptions.

In this example, the computational instance 322 may additionally or alternatively determine a total license rights consumption that results from deploying both the first and second software applications in accordance with the proposed configuration. This total license rights consumption may include projected total licensing costs for the first and second software applications, and/or a projected change in total licensing costs for the first and second software applications, among others. As such, the computational instance 322 may additionally or alternatively provide, to the client device 600, a representation of the GUI that displays a graphical indication of the total license rights consumption.

In yet another case, computational instance 322 may determine and provide, to a client device for display via a GUI, information related to impact of a configuration change to two or more computing devices on license rights consumption for two or more software applications.

For example, the licensing information 606 may indicate current license rights consumption respectively for each of first and second software application, and client device 600 may display nominal configurations respectively of first and second computing devices within the managed network. The first software application may be deployed and/or may be a candidate for deployment on the first and/or second computing devices. Similarly, the second software application may be deployed and/or may be a candidate for deployment on the first and/or second computing devices.

Given this, the computational instance 322 may receive, from the client device 600, a first indication of a first proposed configuration of the first computing device as well as a second indication of a second proposed configuration of the second computing device. Responsively, the computational instance 322 may determine (i) a first projected license rights consumption that results from deploying the first software application in accordance with the first and/or second configurations and (ii) a second projected license rights consumption that results from deploying the second software application in accordance with the first and/or second configurations. Here again, each such projected license rights consumption may respectively include a projected number of license rights to be used in association with the respective software application, a projected change in the number of license rights used in association with the respective software application, projected licensing costs for the respective software application, and/or a projected change in licensing costs for the respective software application, among others. As such, the computational instance 322 may provide, to the client device 600, a representation of the GUI that displays graphical indication(s) of the first and second projected license rights consumptions.

In this example, the computational instance 322 may additionally or alternatively determine a total license rights consumption that results from (i) deploying the first software application in accordance with the first and/or second configurations and (ii) deploying the second software application in accordance with the first and/or second configurations. Here again, this total license rights consumption may include projected total licensing costs for the first and second software applications, and/or a projected change in total licensing costs for the first and second software application, among other possibilities. As such, the computational instance 322 may additionally or alternatively provide, to the client device 600, a representation of the GUI that displays a graphical indication of the total license rights consumption. Other cases and examples are also possible.

In this way, given that an enterprise may have numerous computing devices, software applications, and associated software licenses, the present disclosure may help reduce the time and complexity of determining impact of proposed computing device configuration(s) on software license rights consumption, and may provide valuable information to the enterprise via a GUI, which may help the enterprise make more informed decision(s) as to whether or not to carry out certain changes to computing device configuration(s).

VIII. Example Graphical User Interfaces

FIG. 7 depict GUIs, in accordance with example embodiments. Each of these GUIs may be provided for display on a computing device (e.g. a client device associated with managed network 300). However, it should be understood that these GUIs are merely for purposes of illustration. The applications described herein may provide GUIs that format information differently, include more or less information, include different types of information, and relate to one another in different ways.

FIG. 7 depicts an example GUI 702 that displays a nominal configuration of a computing device and that provides features for indicating a proposed configuration of the computing device. In particular, GUI 702 includes an identification section 704 and a configuration section 706. The identification section 704 may display identifying characteristics of the computing device, such as a name "Server-WS18", asset tag "SAMWS10018", manufacturer "XYZ", a company "ABC", a serial number "SAM-141F133", and a model identifier "ABCXYZ123". Additionally, the configuration section 706 may display information related to the nominal configuration, such as a RAM of "1,791 MB", a CPU manufacture "IBM", a CPU type "Power 5+", a CPU speed of "2,394 MHz", a CPU count (i.e., a nominal count of physical processors) of "8", and a CPU core count (i.e., a nominal count of processor cores per physical processor) of "2" (not shown).

Moreover, GUI 702 is also shown to include an interface feature 708 that is arranged for specifying characteristics of a proposed configuration of the computing device, and may also include a submission feature 710 that is selectable to cause a client device to provide, to a computational instance, an indication of the proposed configuration. For example, FIG. 7 shows a proposal to change the CPU core count from "2" processor cores per physical processor to "4" processor cores per physical processor. And selection of the submission feature 710 may then cause the client device displaying GUI 702 to provide an indication of this proposed change to a computational instance.

Accordingly, when the computational instance receives an indication of the proposed configuration of the computing device, the computational instance may determine a projection license rights consumption that may result from this proposed configuration, as described herein. Then, the computational instance may provide, to the client device, a representation of a GUI 712 that displays the projected license rights consumption. For example, as shown in FIG. 7, GUI 712 may display (i) current software licensing costs of "$69, 944" for the managed network, (ii) projected software licensing costs of "$127,929.33" for the managed network, and (iii) a projected change in licensing costs of "$57,985.33" for the managed network. Other examples and illustrations are also possible.

Given this, an enterprise could simply provide information related to a proposed computing device configuration via the GUI(s), and may conveniently receive viewable information related to a projected licensing impact of the proposed configuration, thereby saving time and reducing complexity of determining such a projected impact. As noted, such a licensing impact may often be overlooked by an enterprise. Thus, the information displayed on the GUI(s) may help the enterprise make a more informed decision as to whether or not to carry out certain changes to computing device configuration(s).

IX. Example Operations

Figure 8:
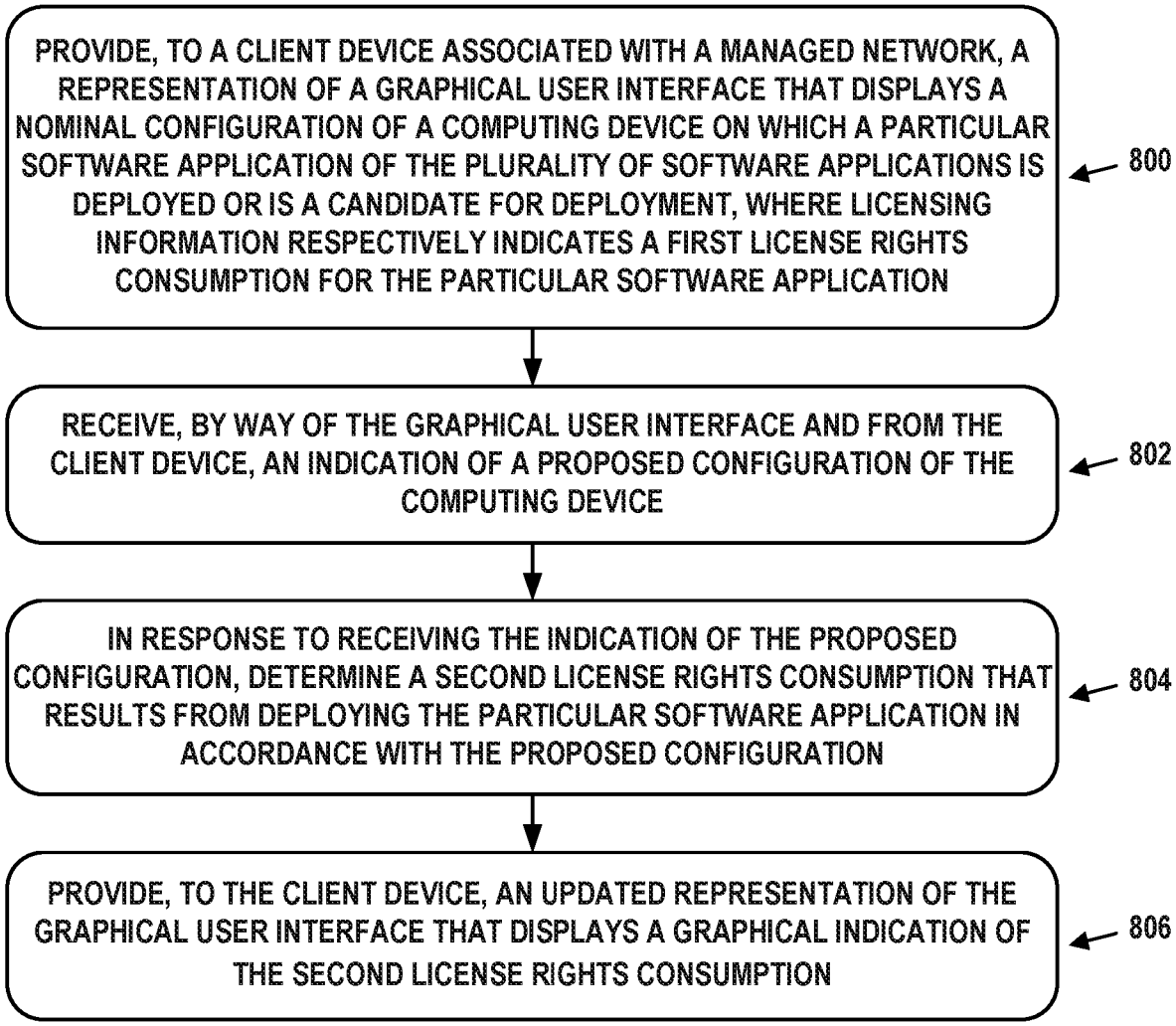
FIG. 8 is another flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve providing, by one or more server devices to a client device associated with a managed network, a representation of a graphical user interface that displays a nominal configuration of a computing device on which a particular software application, of a plurality of software applications associated with the managed network, is deployed or is a candidate for deployment, where the one or more server devices are disposed within a remote network management platform that manages the managed network, where a database is also disposed within the remote network management platform, where the database contains licensing information that includes respective indications of license rights allocations and consumption for each of the plurality of software applications, and where the licensing information respectively indicates a first license rights consumption for the particular software application.

Block 802 may involve receiving, by one or more server devices from the client device and by way of the graphical user interface, an indication of a proposed configuration of the computing device.

Block 804 may involve, in response to receiving the indication of the proposed configuration, determining, by the one or more server devices, a second license rights consumption that results from deploying the particular software application in accordance with the proposed configuration.

Block 806 may involve providing, by the one or more server devices to the client device, an updated representation of the graphical user interface that displays a graphical indication of the second license rights consumption.

In some embodiments, the representation of the graphical user interface that displays the nominal configuration may include an identification section and a configuration section. The identification section may be arranged to display one or more identifying characteristics of the computing device, and the configuration section may be arranged to display one or more of (i) a nominal count of physical processors on the computing device or (ii) a nominal count of processor cores on the computing device. Moreover, the configuration section may include an interface feature that is arranged for specifying characteristics of the proposed configuration.

In such embodiments, the interface feature being arranged for specifying the characteristics of the proposed configuration may involve the interface feature being arranged for one or more of (i) specifying a proposed count of physical processors on the computing device that is different from the nominal count or (ii) specifying a proposed count of processor cores on the computing device that is different from the nominal count.

Additionally or alternatively, in such embodiments, the representation of the graphical user interface that displays the nominal configuration may further include a submission feature that is selectable to cause the receiving of the indication of the proposed configuration.

In some embodiments, the computing device may be a server device of the managed network or a virtual machine on the server device.

In some embodiments, the nominal configuration may be a nominal hardware configuration, and the proposed configuration may be a proposed hardware configuration that is different from the nominal hardware configuration.

In such embodiments, the nominal hardware configuration may involve a nominal count of physical processors on the computing device, and the proposed hardware configuration may involve a proposed count of physical processors on the computing device that is different from the nominal count.

Additionally or alternatively, in such embodiments, the nominal hardware configuration may involve a nominal count of processor cores on the computing device, and the proposed hardware configuration may involve a proposed count of processor cores on the computing device that is different from the nominal count.

In some embodiments, the nominal configuration may be a nominal software configuration, and the proposed configuration may be a proposed software configuration that is different from the nominal software configuration.

In some embodiments, the first license rights consumption may involve a number of license rights used in association with the particular software application, and the second license rights consumption may involve once or more of (i) a projected number of license rights to be used in association with the particular software application or (ii) a projected change in the number of license rights used in association with the particular software application.

In some embodiments, the first license rights consumption may involve a licensing cost for the particular software application, where the licensing cost is based at least on the license rights allocations and consumptions for the particular software application. And the second license rights consumption may involve one or more of (i) a projected licensing cost for the particular software application or (ii) a projected change in licensing costs for the particular software application, where the projected licensing cost and the project change in licensing costs are based at least on the projected configuration of the computing device and the license rights allocations and consumptions for the particular software application.

In some embodiments, the licensing information may specify that license rights for the particular software application include one of the following: per-core license rights, per-processor license rights, or per-device license rights. And determining the second license rights consumption may be based at least on the licensing information.

In some embodiments, the indication of the proposed configuration may be a first indication of a first proposed configuration of a first computing device, the representation of the graphical user interface may also display a nominal configuration of a second computing device on which the particular software application is deployed or is a candidate for deployment, and the one or more server devices may be further configured to: receive, by way of the graphical user interface and from the client device, a second indication of a second proposed configuration of the second computing device; in response to receiving the first and second indications, determine a total license rights consumption that results from deploying the particular software application in accordance with the first and second proposed configurations; and provide, to the client device, a further updated representation of the graphical user interface that displays a graphical indication of the total license rights consumption.

In some embodiments, the licensing information may respectively indicate a third license rights consumption for a further software application of the plurality of software applications that is deployed or is a candidate for deployment on the computing device, and the one or more server devices may be further configured to: in response to receiving the indication of the proposed configuration, determine a fourth license rights consumption that results from deploying the further software application in accordance with the proposed configuration; and provide, to the client device, a further updated representation of the graphical user interface that displays a graphical indication of the fourth license rights consumption.

In some embodiments, a further software application may be deployed or may be a candidate for deployment on the computing device, and the one or more server devices may be further configured to: in response to receiving the indication of the proposed configuration, determine a total license rights consumption that results from deploying both the particular and the further software applications in accordance with the proposed configuration; and provide, to the client device, a further updated representation of the graphical user interface that displays a graphical indication of the total license rights consumption.

In some embodiments, the licensing information may respectively indicate a third license rights consumption for a further software application that is deployed or is a candidate for deployment on a further computing device, the representation of the graphical user interface may also display a nominal configuration of the further computing device, and the one or more server devices may be further configured to: receive, by way of the graphical user interface and from the client device, a further indication of a further proposed configuration of the further computing device; in response to receiving the further indication of the further proposed configuration, determine a fourth license rights consumption that results from deploying the further software application in accordance with the further proposed configuration; and provide, to the client device, a further updated representation of the graphical user interface that displays a graphical indication of the fourth license rights consumption.

In some embodiments, the indication of the proposed configuration may be a first indication of a first proposed configuration of a first computing device, the representation of the graphical user interface may also display a nominal configuration of a second computing device on which a second software application is deployed or is a candidate for deployment, and the one or more server devices may be further configured to: receive, by way of the graphical user interface and from the client device, a second indication of a second proposed configuration of the second computing device; in response to receiving the first and second indications, determine a total license rights consumption that results from (i) deploying the particular software application in accordance with the first proposed configuration and (ii) deploying the second software application in accordance with the second proposed configuration; and provide, to the client device, a further updated representation of the graphical user interface that displays a graphical indication of the total license rights consumption.

In some embodiments, the one or more server devices may be further configured to: based at least on the licensing information, determine whether or not the second license rights consumption exceeds a number of license rights allocated in association with the particular software application; and provide, to the client device, a further updated representation of the graphical user interface that displays a graphical indication of whether the second license rights consumption exceeds the number of license rights allocated in association with the particular software application.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a database disposed within a remote network management platform that manages a managed network, wherein the database contains licensing information that includes respective indications of license rights allocations and consumption for each of a plurality of software applications associated with the managed network; and
one or more server devices, disposed within the remote network management platform, configured to:
provide, to a client device associated with the managed network, a representation of a graphical user interface that displays a nominal configuration of a computing device on which a particular software application of the plurality of software applications is deployed or is a candidate for deployment, wherein the licensing information respectively indicates a first license rights consumption for the particular software application, wherein the nominal configuration is displayed via a first window of the graphical user interface, and wherein the first license rights consumption is displayed via a second window of the graphical user interface, and;
receive, by way of the first window of the graphical user interface and from the client device, an indication of a proposed configuration of the computing device;
in response to receiving the indication of the proposed configuration, determine a second license rights consumption that results from deploying the particular software application in accordance with the proposed configuration; and
provide, to the client device, an updated representation of the graphical user interface that displays a graphical indication of the second license rights consumption via the second window of the graphical user interface.

2. The system of claim 1,
wherein the first window of the graphical user interface that displays the nominal configuration includes an identification section and a configuration section,
wherein the identification section is arranged to display one or more identifying characteristics of the computing device,
wherein the configuration section is arranged to display one or more of (i) a nominal count of physical processors on the computing device or (ii) a nominal count of processor cores on the computing device, and
wherein the configuration section includes an interface feature that is arranged for specifying characteristics of the proposed configuration.

3. The system of claim 2,
wherein the interface feature being arranged for specifying the characteristics of the proposed configuration comprises the interface feature being arranged for one or more of (i) specifying a proposed count of physical processors on the computing device that is different from the nominal count or (ii) specifying a proposed count of processor cores on the computing device that is different from the nominal count.

4. The system of claim 2,
wherein the first window of the graphical user interface that displays the nominal configuration includes a submission feature that is selectable to cause the receiving of the indication of the proposed configuration.

5. The system of claim 1, wherein the computing device comprises a server device of the managed network or a virtual machine on the server device.

6. The system of claim 1,
wherein the nominal configuration comprises a nominal hardware configuration, and
wherein the proposed configuration comprises a proposed hardware configuration that is different from the nominal hardware configuration.

7. The system of claim 6,
wherein the nominal hardware configuration comprises a nominal count of physical processors on the computing device, and
wherein the proposed hardware configuration comprises a proposed count of physical processors on the computing device that is different from the nominal count.

8. The system of claim 6,
wherein the nominal hardware configuration comprises a nominal count of processor cores on the computing device, and
wherein the proposed hardware configuration comprises a proposed count of processor cores on the computing device that is different from the nominal count.

9. The system of claim 1,
wherein the nominal configuration comprises a nominal software configuration, and
wherein the proposed configuration comprises a proposed software configuration that is different from the nominal software configuration.

10. The system of claim 1,
wherein the first license rights consumption comprises a number of license rights used in association with the particular software application, and
wherein the second license rights consumption comprises once or more of (i) a projected number of license rights to be used in association with the particular software application or (ii) a projected change in the number of license rights used in association with the particular software application.

11. The system of claim 1,
wherein the first license rights consumption comprises a licensing cost for the particular software application, wherein the licensing cost is based at least on the license rights allocations and consumptions for the particular software application, and
wherein the second license rights consumption comprises one or more of (i) a projected licensing cost for the particular software application or (ii) a projected change in licensing costs for the particular software application, wherein the projected licensing cost and the projected change in licensing costs are based at least on the proposed configuration of the computing device and the license rights allocations and consumptions for the particular software application.

12. The system of claim 1,
wherein the licensing information specifies that license rights for the particular software application comprise one of the following: per-core license rights, per-processor license rights, or per-device license rights, and
wherein determining the second license rights consumption is based at least on the licensing information.

13. The system of claim 1, wherein the indication of the proposed configuration comprises a first indication of a first proposed configuration of a first computing device, wherein the first window of the graphical user interface also displays a nominal configuration of a second computing device on which the particular software application is deployed or is a candidate for deployment, and wherein the one or more server devices are configured to:
receive, by way of the graphical user interface and from the client device, a second indication of a second proposed configuration of the second computing device;
in response to receiving the first and second indications, determine a total license rights consumption that results from deploying the particular software application in accordance with the first and second proposed configurations; and
provide, to the client device, a further updated representation of the graphical user interface that displays a graphical indication of the total license rights consumption.

14. The system of claim 1, wherein the licensing information respectively indicates a third license rights consumption for a further software application of the plurality of software applications that is deployed or is a candidate for deployment on the computing device, and wherein the one or more server devices are configured to:
in response to receiving the indication of the proposed configuration, determine a fourth license rights consumption that results from deploying the further software application in accordance with the proposed configuration; and
provide, to the client device, a further updated representation of the graphical user interface that displays a graphical indication of the fourth license rights consumption.

15. The system of claim 1, wherein a further software application is deployed or is a candidate for deployment on the computing device, and wherein the one or more server devices are configured to:

in response to receiving the indication of the proposed configuration, determine a total license rights consumption that results from deploying both the particular and the further software applications in accordance with the proposed configuration; and provide, to the client device, a further updated representation of the graphical user interface that displays a graphical indication of the total license rights consumption.

16. The system of claim 1, wherein the licensing information respectively indicates a third license rights consumption for a further software application that is deployed or is a candidate for deployment on a further computing device, wherein the first window of the graphical user interface also displays a nominal configuration of the further computing device, and wherein the one or more server devices are configured to:

receive, by way of the graphical user interface and from the client device, a further indication of a further proposed configuration of the further computing device;

in response to receiving the further indication of the further proposed configuration, determine a fourth license rights consumption that results from deploying the further software application in accordance with the further proposed configuration; and provide, to the client device, a further updated representation of the graphical user interface that displays a graphical indication of the fourth license rights consumption.

17. The system of claim 1, wherein the indication of the proposed configuration comprises a first indication of a first proposed configuration of a first computing device, wherein the first window of the graphical user interface also displays a nominal configuration of a second computing device on which a second software application is deployed or is a candidate for deployment, and wherein the one or more server devices are configured to:

receive, by way of the graphical user interface and from the client device, a second indication of a second proposed configuration of the second computing device;

in response to receiving the first and second indications, determine a total license rights consumption that results from (i) deploying the particular software application in accordance with the first proposed configuration and (ii) deploying the second software application in accordance with the second proposed configuration; and provide, to the client device, a further updated representation of the graphical user interface that displays a graphical indication of the total license rights consumption.

18. The system of claim 1, wherein the one or more server devices are configured to:

based at least on the licensing information, determine whether or not the second license rights consumption exceeds a number of license rights allocated in association with the particular software application; and provide, to the client device, a further updated representation of the graphical user interface that displays a graphical indication of whether the second license rights consumption exceeds the number of license rights allocated in association with the particular software application.

19. A method comprising:

providing, by one or more server devices to a client device associated with a managed network, a representation of a graphical user interface that displays a nominal configuration of a computing device on which a particular software application, of a plurality of software applications associated with the managed network, is deployed or is a candidate for deployment, wherein the one or more server devices are disposed within a remote network management platform that manages the managed network, wherein a database is also disposed within the remote network management platform, wherein the database contains licensing information that includes respective indications of license rights allocations and consumption for each of the plurality of software applications, wherein the licensing information respectively indicates a first license rights consumption for the particular software application; wherein the nominal configuration is displayed via a first window of the graphical user interface, and wherein the first license rights consumption is displayed via a second window of the graphical user interface, and;

receiving, by one or more server devices from the client device and by way of the first window of the graphical user interface, an indication of a proposed configuration of the computing device;

in response to receiving the indication of the proposed configuration, determining, by the one or more server devices, a second license rights consumption that results from deploying the particular software application in accordance with the proposed configuration; and providing, by the one or more server devices to the client device, an updated representation of the graphical user interface that displays a graphical indication of the second license rights consumption via the second window of the graphical user interface.

20. An article of manufacture including a non-transitory computer-readable medium, having stored thereon program instructions that, upon execution by one or more server devices of a remote network management platform that manages a managed network, cause the server devices to perform operations comprising:

providing, to a client device associated with the managed network, a representation of a graphical user interface that displays a nominal configuration of a computing device on which a particular software application, of a plurality of software applications associated with the managed network, is deployed or is a candidate for deployment, wherein a database is disposed within the remote network management platform, wherein the database contains licensing information that includes respective indications of license rights allocations and consumption for each of the plurality of software applications, wherein the licensing information respectively indicates a first license rights consumption for the particular software application; wherein the nominal configuration is displayed via a first window of the graphical user interface, and wherein the first license rights consumption is displayed via a second window of the graphical user interface;

receiving, from the client device and by way of the first window of the graphical user interface, an indication of a proposed configuration of the computing device;

in response to receiving the indication of the proposed configuration, determining a second license rights consumption that results from deploying the particular software application in accordance with the proposed configuration; and providing, to the client device, an updated representation of the graphical user interface that displays a graphical indication of the second license rights consumption via the second window of the graphical user interface.

* * * * *